United States Patent [19]
Claeson et al.

[11] 3,886,136
[45] May 27, 1975

[54] NEW SUBSTRATES FOR DIAGNOSTIC USE, WITH HIGH SUSCEPTIBILITY TO TRYPSIN AND OTHER PROTEOLYTIC ENZYMES OF THE TYPE PEPTIDE PEPTIDOHYDROLASES

[75] Inventors: Karl Goran Claeson; Birgitta Gunilla Karlsson, both of Goteborg; Lars-Gundro Svendsen, Molndal, all of Sweden

[73] Assignee: AB Bofors, Bofors, Sweden

[22] Filed: Apr. 24, 1973

[21] Appl. No.: 354,038

[30] Foreign Application Priority Data
May 2, 1972 Sweden.............................. 5758/72

[52] U.S. Cl. ........... 260/112.5; 195/103.5; 424/177
[51] Int. Cl.. C07c 103/52; C07g 7/00; A61k 27/00
[58] Field of Search................................ 260/112.5

[56] References Cited
OTHER PUBLICATIONS
Nachlas et al., Arch. Biochem. Biophys., 108, 266–274 (1964).
Plapinger et al., J. Org. Chem., 30 1781–1785 (1965).

*Primary Examiner*—Lewis Gotts
*Assistant Examiner*—Reginald J. Suyat
*Attorney, Agent, or Firm*—Pollock, Philpitt & Vande Sande

[57] ABSTRACT
Substrate with high susceptibility to peptide peptidohydrolases represented by the formula:

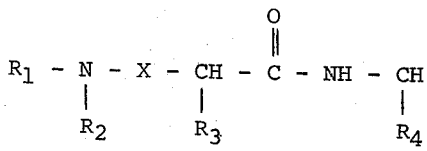
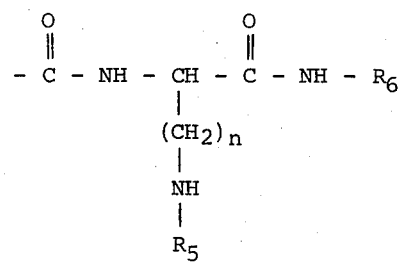

or its salts, where $R_1$ is hydrogen, an alkyl-carbonyl having 1–12 carbon atoms, a ω-aminoalkyl-carbonyl having 1–12 carbon atoms in a straight chain, cyclohexyl-carbonyl, a ω-cyclohexylalkyl-carbonyl having 1–6 carbon atoms in a straight chain, 4-aminomethyl-cyclohexyl-carbonyl, benzoyl, a ω-phenylalkylcarbonyl having 1–6 carbon atoms in a straight chain, benzene-sulphonyl or 4-toluene-sulphonyl; $R_2$ is hydrogen, phenyl, cyclohexyl, or an alkyl having 1–6 carbon atoms; X is methylene or a single bond; $R_3$ is a straight, branched or cyclic alkyl group having 3–8 carbon atoms; $R_4$ is a straight, branched or cyclic alkyl group having 3–8 carbon atoms, phenyl or benzyl; $n$ is 3 or 4; $R_5$ is hydrogen or guanyl; and $R_6$ is phenyl, nitrophenyl, methylnitrophenyl, dinitrophenyl, naphthyl, nitronaphthyl, quinolyl, or nitroquinolyl.

19 Claims, No Drawings

NEW SUBSTRATES FOR DIAGNOSTIC USE, WITH HIGH SUSCEPTIBILITY TO TRYPSIN AND OTHER PROTEOLYTIC ENZYMES OF THE TYPE PEPTIDE PEPTIDOHYDROLASES

The present invention relates to new substrates for diagnostic use with high susceptibility to proteolytic enzymes of the type peptide peptidohydrolases. The substrates according to the invention are intended for quantitative determination of classified and hitherto unclassified enzymes of the type E.C. 3.4.4., especially such that break down peptides or proteins in the peptide chain at the carboxylic side of arginine or lysine; e.g., trypsin, thrombin, plasmin, Reptilase from Pentapharm, Basel, Switzerland, Arvine from Ferring AB, Malmo, Sweden, and the hitherto unclassified enzyme Brinase from AB Astra, Sodertalje, Sweden. The substrates may further be used for the study of reactions in which such enzymes are formed, inhibited or consumed, and also for the determination of factors which affect or participate in such reactions, for example the determination of proenzymes, activators, antienzymes and enzyme inhibitors.

The Enzyme Nomenclature recommended by The International Union of Biochemistry Elsevier, Amsterdam, 1965 was used in the classification of the enzymes.

Compounds (substrates) which have previously been used for quantitative determination of the above mentioned enzymes are described in "Methoden der enzymatischen Analyse," Vol. I, p. 1023 (Ed. Bergmeyer, H. U., Verlag Chemie, 1970). Depending upon which of the catalytic reactions of the proteolytic enzymes that takes place — the esterolytic or the amidolytic — these synthetic substrates may in principle be divided into two main groups: ester substrates and amide substrates. The largest group of synthetic substrates as previously used is the group of ester substrates. This depends on the fact that these are converted much more rapidly by the peptide peptidohydrolases than the amide substrates hitherto produced. However, the principal biological function of the enzymes classified as peptide peptidohydrolases is, as evident from the name; to hydrolyze peptide or amide bonds, but not ester bonds, of natural substrates. In the literature (Blood Clotting Enzymology, p. 36 and 42 – 44, Ed.: Seegers W. H., Academie Press, 1967) it is reported that the ratio between the reaction velocities of the esterolytic and the amidolytic catalyses of thrombin is not constant under different reaction conditions. For this reason, synthetic amide substrates which have much greater susceptibility to the enzymes in question, and which also more rapidly may be broken down to measurable products that those hitherto known, have been desirable.

In order to study and follow up the reaction course of the enzymatic hydrolysis the amide substrates are particularly suitable since they may give:

a. chromophoric products that are easy to measure spectrophotometrically and have light absorption maxima which do not coincide with those of the original amide substrates;
b. fluorescent products which may be measured by means of fluorescence spectrophotometry;
c. products which, after coupling with a suitable reagent give rise to coupling products which may be photometrically measured with high sensitivity.

Some synthetic amide substrates with hydrolysable chromophoric groups have come into use. These are primarily of the types $N^\alpha$-unsubstituted and $N^\alpha$-substituted mono-aminoacid-p-nitroanilide derivatives and mono amino acid-$\beta$-naphtylamide derivatives. Among these substances $N^\alpha$-benzoyl-DL-arginine-p-nitroaniline hydrochloride (BAPNA) may be mentioned as a reagent for trypsin (E.C. 3.4.4.) and for reactions in which trypsin participates. The enzymatic hydrolysis of this substrate produces the chromophoric product p-nitroaniline, which may readily be measured spectrophotometrically.

However, these earlier known amide substrates do not possess the desired specificity and sensitivity. This is a significant draw-back, which may give rise to a more involved procedure in the taking of specimen, because a considerable amount of biological material will then be required. Furthermore, the enzymatic reaction time is long and the precision of the enzyme determination may be unsatisfactory.

The new substrates of the amide type according to the invention which have a very high susceptibility to peptide peptidohydrolases are represented by the following general formula:

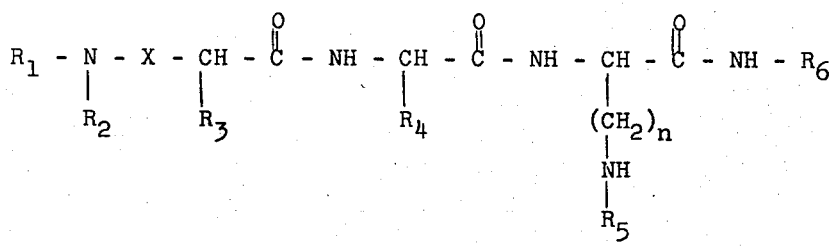

or its salts, where $R_1$ may be selected from hydrogen, an acyl having from 1 to 12 carbon atoms, a $\omega$-aminoacyl having from 1 to 12 carbon atoms, cyclohexylcarbonyl, a $\omega$-cyclohexyl-acyl, 4-aminomethyl-cyclohexylcarbonyl, benzoyl, a benzoyl substituted with e.g., one or more halogen atoms, methyl-, amino- or phenylgroups, etc., a $\omega$-phenyl-acyl having from 1 to 6 carbon atoms in the acyl part and where the phenyl group may be substituted, benzenesulphonyl and 4-toluenesulphonyl.

$R_2$ may be selected from hydrogen, phenyl and an alkyl having from 1 – 6 carbon atoms and cyclohexyl.

X may be selected from methylene- and a single bond.

$R_3$ may be selected from a straight, branched or cyclic alkyl group having from 3 to 8 carbon atoms.

$R_4$ may be selected from a straight, branched or cyclic alkyl group having from 3–8 carbon atoms, phenyl and benzyl.

$n$ may be selected from 2, 3 and 4.

$R_5$ may be selected from hydrogen and guanyl.

$R_6$ may be selected from phenyl, nitrophenyl, methylnitrophenyl, dinitrophenyl, naphthyl, nitronaphthyl, quinolyl and nitroquinolyl.

The new substrates may be produced according to two principally different methods.
1. The first method is based upon the coupling of the chromophoric group $R_5$ to the amino acid in question, and then a step-by-step building up of the desired peptide structure by means of gradual coupling of the remaining amino acids. The chromophoric group is here used as a blocking group for the C-terminal carboxyl group of the first amino acid.
2. The other method is based upon a step-by-step building up of the desired peptide structure and upon the subsequent removal of used blocking groups, and finally coupling of the chromophoric group $R_5$ to the peptide structure.

In the stepwise synthesis of the peptide derivatives such coupling methods have been used that are well known and commonly used in the peptide chemistry. Such well known blocking groups, that are commonly used within the peptide chemistry, as for example Cbo (carbobenzoxy), MeOCbo (p-methoxycarbobenzoxy), $NO_2Cbo$ (p-nitrocarbobenzoxy), MCbo (p-methoxyphenylazo-carbobenzoxy), BOC (tert.-butyloxycarbonyl), TFA (trifluoroacetyl) or formyl are used as amino blocking groups. The α-carboxyl group can be activated by means of conversion to different activated, in peptide chemistry well known and often used derivatives, which may either be isolated or be generated in situ, as for example p-nitrophenylester, trichlorophenylester, pentachlorophenylester, N-hydroxysuccinimideester, acid azide, acid anhydride, which may either be symmetric or unsymmetric. It may also be activated with a carbodiimide such as N,N'-dicyclohexylcarbodiimide. The C-terminal carboxyl group in the amino peptide derivative or the amino acid derivative may be protected by esterifying to e.g., methyl-, ethyl- or isopropylester or by means of conversion to the chromophoric aniline derivative, which thus works as a blocking group during the building up of the peptide chain. Those free functional groups which do not take part in the reaction, may during the synthesis of the peptides or the peptide derivatives be protected in the following manner:

For the purpose of blocking the arginyl δ-guanido group and the lysyl ε-amino group, one may use such amino blocking groups, commonly used within peptide chemistry, as for example $NO_2$, Tos (p-toluenesulphonyl) or only protonization as protection for the guanido group, and Cbo (carbobenzoxy), BOC (tert. butyloxycarbonyl) or also Tos for the ε-amino-group. As protection for the hydroxyl group in tyrosin one may use such blocking groups, commonly used within the peptide chemistry, as for example benzyl and tertiary butyl protection groups.

In the stepwise synthesis of the peptide structure a systematic purification by means of gel filtration may be carried out after each coupling of a new amino acid. For this gel filtration a column is used which is packed with a material suitable for the gel filtration, e.g., a cross-linked dextran gel of the type Sephadex ® G or LH from Pharmacia Fine Chemicals, Uppsala, Sweden. Another suitable gel consists of copolymers of vinylacetate e.g. of the type Merckogel OR-PVA from A G E. Merck, Darmstadt, West-Germany. The gel material is used equilibrated with a suitable solvent and elution is then carried out with the same solvent, e.g., methanol, ethanol, acetone, dimethylformamide, etamide, dimethylsulphoxide or hexamethylphosphoric triamide.

The invention will be described more in detail in the following examples which demonstrate the production of different substrates according to the invention by means of stepwise synthesis. However, these examples do not limit the scope of invention.

In the thin layer chromatographic analysis of the eluate and the products glass plates were used with silica gel (F 254 from A G E. Merck, Darmstadt, West-Germany) as absorption medium. For the development of the thin layer chromatograms the following solvent systems have been used:

| A: | n-butanol:acetic acid:water | (3:1:1) |
| C: | n-propanol:ethyl acetate:water | (7:1:2) |
| D: | n-heptane:n-butanol:acetic acid | (3:2:1) |
| $P_1$: | chloroform:methanol | (9:1) |

After the thin layer chromatographing, the plates were developed first in UV light (254 nm), and subsequently with the chlorine/toluidine reaction (Ref.: G. Pataki: Dunnschluchtchromatografie in der Aminosaure und Peptid-Chemie, Walter de Gruyter & Co., Berlin, 1966, p. 125) as a development method.

Unless otherwise stated all amino acids used have the L-configuration, and the abbreviations have the following meanings:
Ala = Alanine
Arg = Arginine
Ile = Isoleucine
Leu = Leucine
Lys = Lysine
Val = Valine Further abbreviations as used in the examples:

| Ac | =Acetyl |
| $Ac_2O$ | =Acetic anhydride |
| AcOH | =Acetic acid |
| BOC | =tert.-Butyloxycarbonyl |
| Bz | =Benzoyl |
| Bzl | =Benzyl |
| $Bz_2O$ | =Benzoic anhydride |
| Cbo | =Carbobenzoxy |
| DCCI | =Dicyclohexylcarbodiimide |
| DCHA | =Dicyclohexylamine |
| DCU | =Dicyclohexylcarbamide |
| DMF | =Dimethylformamide |
| $Et_3N$ | =Triethylamine |
| HMPTA | =N, N, N', N', N'', N''-hexamethylphosphoric triamide |
| MCbo | =p-Methoxyphenylazocarbobenzoxy |
| MeOH | =Methanol |
| NA | =Naphthylamine |
| OtBu | =tert. -Butyloxy |
| OEt | =Ethyloxy |
| OMe | =Methyloxy |
| OpNP | =p-Nitrophenoxy |
| OisoPr | =iso-Propyloxy |
| pNA | =p-Nitroanilide |
| TFA | =Trifluoroacetyl |
| Tos | =p-Toluenesulphonyl |
| TLC | =Thin layer chromatography |

The gels Sephadex ® G-15 and G-25 as used for the gel filtration are both cross-linked dextran gels with different cross-linking degree from Pharmacia Fine Chemicals, Uppsala, Sweden. The gel Sephadex® LM-20 is a hydroxypropylated crosslinked dextran gel from Pharmacia Fine Chemicals, Uppsala, Sweden.

EXAMPLE I

H - Leu - Leu - Arg - pNA - 2 HCl

Example Ia: Cbo - Arg ($NO_2$) - pNA 35,3 g (0.1 mole) of dry Cbo - Arg ($NO_2$) - OH are dissolved in 200 ml of freshly destilled HMPTA at room-temperature, where upon 10.1 g (0.1 mole) of $Et_3N$ and 24.6 g (0.15 mole) of p-nitrophenylisocyanate are added with stirring under completely dry conditions. After 24 hours at room-temperature the reaction mixture is poured into 2 l. of a 2% sodium-bicarbonate solution while stirring. The precipitate, which separates out, is filtered off and washed three times with 0.5 l. of a 2% sodium bicarbonate solution, twice with 0.2 l. of destilled water, twice with 0.5 l. of 0.5 N hydrochloric acid and finally five times with 0.2 l. of destilled water. After drying, the crude product is suspended in warm MeOH. The insoluble part, consisting of $N,N^1$-bis-p-nitrophenyl-carbamide, is filtered off. The filtrate is purified by gel chromatography on a column of Sephadex® LH-20 equilibrated with MeOH.

Yield: 29.8 g (63.0%) of I$a$, m.p. 185°–188°C, homogeneous according to TLC in $P_1$ and C, and $[\alpha]_D^{24} = -1.3°$ (c = 1.1; AcOH).

Example I$b$: Cbo - Leu - Arg ($NO_2$) - pNA

Method of synthesis: 5.0 g (10.6 mmoles) of I$a$ are dissolved in 21 ml of AcOH and 22 ml of 4 N HBr in AcOH under completely dry conditions. The reaction mixture is stirred for one hour, and thereafter it is slowly poured into 200 ml of vigerously stirred ether, and 1.5 HBr . H - Arg ($NO_2$) - pNA precipitates out. The ether solution is decanted and the granular residue is treated another three times with 100 ml of ether in order to remove benzyl bromide and the surplus of HBr and AcOH. After drying in vacuum over $P_2O_5$ the yield of the hydrobromide salt of the amino acid derivate is quantitative (4.87 g). 4.87 g (10.6 mmoles) of 1.5 HBr . H - Arg ($NO_2$) - pNA are dissolved in 50 ml of destilled DMF. The solution is cooled to −10°C and 1.6 g (15.9 mmoles) of $Et_3$N are added to liberate H - Arg ($NO_2$) - pNA from its hydrobromide salt. The mixture is allowed to react for 1 hour under dry conditions. Precipitated $Et_3$N.HBr is filtered off and the filtrate is cooled to −10°C. 4.3 g (12.7 mmoles) of Cbo - Leu - OpNP are added and the solution may now slowly arise to room temperature. After 3 hours the solution is cooled again to −10°C and buffered with 0.55 g (5 mmoles) of $Et_3$N. The buffering procedure is repeated once more after 2–3 hours. After 24 hours of reaction time the solution is evaporated at 40°C in vacuum to dryness. The residue is treated three times with 100 ml of destilled water and it is thereafter dried in vacuum. Purification: The dry residue is dissolved in MeOH and purified by gel chromatography on a column of Sephadex® LH-20 equilibrated with MeOH. Yield: 6.1 g (98%) of amorphous I$b$, homogeneous according to TLC in $P_1$ and $[\alpha]_D^{25} = -33.3°$ (c = 1.0; MeOH).

Example I$c$: Cbo - Leu - Leu - Arg ($NO_2$) - pNA

Starting materials: 2.8 g (4.77 mmoles) of I$b$ and 2.22 g (5.72 mmoles) of Cbo - Leu - OpNP.

Method of synthesis: According to Example I$b$.

Purification: Gel chromatography on Sephadex® LH-20 in MeOH.

Yield 2.5 g (80%) of amorphous I$c$, homogeneous according to TLC in $P_1$ and $[\alpha]_D^{25} = -9.9°$ (c = 1.0; DMF).

Example I$d$ H - Leu - Leu - Arg - pNA · 2HCl 134,2 mg (0.192 mmole) of I$c$ are placed in the reaction vessel of a Sakakibara apparatus. 5 ml of dry hydrogen fluoride are destilled over into the vessel and allowed to react for one hour under stirring. Thus the nitro group protecting the guanidino function of arginine and the Cbo-group are cleaved off. Afterwards the hydrogen fluoride is destilled off under reduced pressure and the dry residue is dissolved in DMF. In order to convert the obtained hydrofluoride derivate of the peptide to its hydrochloride salt, 0.25 ml of concentrated hydrochloric acid is added to the DMF-solution. After evaporation the procedure of conversion is repeated once more.

Purification: The residue after the last evaporation is dissolved in a solution of 50% AcOH and is purified by gelchromatography on a column of Sephadex® G-25 equilibrated with 50% AcOH. The fraction of the eluate containing the pure tripeptide hydrochloride derivate was lyophilized.

Yield: 80.0 mg (71%) of amorphous I, chlorine content 11.83%, homogeneous according to TLC in A and $[\alpha]_D^{23} = -29.9$ (c = 0.59; 50% AcOH). Amino acid analysis showed the following proportions: Leu: 2.0; Arg: 0.95.

Example II: $N^\alpha$ - Bz - Leu - Leu - Arg -pNA . HCl (II)

Example II$a$: $N^\alpha$ - Bz - Leu - Leu - Arg ($NO_2$) - pNA

Starting materials: 703 mg (1 mmole) of I$c$ and 272 mg (1.2 mmoles) of $Bz_2$O.

Method of synthesis: Decarbobenzoxylation of I$c$ is carried out according to Example I$b$. The dry product of H - Leu - Leu - Arg ($NO_2$) - pNA . HBr is filtered off. The filtrate is cooled to −10°C and 272 mg (1.2 mmoles) of $Bz_2$O are added. After 3 hours of reaction time the solution has reached room temperature. It is cooled again and buffered with 0.07 ml (0.5 mmole) of $Et_3$N. The procedure of buffering is repeated after another 3 hours. After 24 hours of reaction time the solution is evaporated in vacuum to dryness. The residue is treated and dried according to the procedure described in Example I$b$.

Purification: Gel chromatography on Sephadex LH-20 in MeOH.

Yield: 550 mg (82%) of amorphous II$a$, homogeneous according to TLC in $P_1$ and $[\alpha]_D^{25} = -3.6°$ (c = 1.01; DMF).

II: $N^\alpha$ - Bz - Leu - Leu - Arg -pNA . HCl

Starting material: 554.8 mg (0.828 mmole) of II$a$.

Method of synthesis: According to Example I$d$.

Purification: Gel chromatography on Sephadex® G-15 in 20% AcOH and Sephadex® LH-20 in MeOH.

Yield: 476 mg (87%) of lyophilized, amorphous II, chlorine content 5.30 %, homogeneous according to TLC in A and $[\alpha]_D^{23} = -73,0°$ (c = 0.66; 50% AcOH). Amino acid analysis showed the following proportions: Leu: 2.0, Arg: 0.95.

Example III: H - β - cyclohexyl - Ala - Val -Arg -pNA . 2 HCl

III$a$. Cbo - Val - Arg ($NO_2$) - pNA

Starting materials: 20.6 g (43.5 mmoles) of I$a$ and 20.3 g (54.3 mmoles) of Cbo - Val - OpNP.

Method of synthesis: According to Example I$b$.

Purification: Recrystallization of the crude product from MeOH. The mother liquor is purified by gel chromatography on Sephadex® LH-20, in MeOH.

Yield: 23.2 g (93.3%) of III$a$, m.p. 200°–202°C, homogeneous according to TLC in $P_1$ and C and $[\alpha]_D^{24} = +5.8°$ (c = 1.0; DMF).

III$b$. Cbo - β - cyclohexyl - Ala - Val - Arg ($NO_2$) - pNA

Starting materials: 0.48 g (0.83 mmole) of IIIa and 0.53 g (1.24 mmoles) of Cbo - β - cyclohexyl - Ala - OpNP having a m.p. of 105°–106°C and $[\alpha]_D^{24} = -28.8°$ ($c = 1.0$; DMF).

Method of synthesis: According to Example Ib.
Purification: Gel chromatography on Sephadex® LH-20 is MeOH.
Yield: 531 mg (88%) of amorphous IIIb, homogeneous according to TLC in $P_1$ and $[\alpha]_D^{23} = -7.3°$ ($c = 2.0$; DMF).

III. H - β - cyclohexyl - Ala - Val - Arg - pNA . 2 HCl

Starting material: 120.4 mg (0.165 mmole) of III b.
Method of synthesis: According to Example Id.
Purification: Gel chromatography on Sephadex® G-15 in 20% AcOH.
Yield: 56.6 mg (55%) of lyophilized, amorphous III, chlorine content 11.32%, homogeneous according to TLC in A, $[\alpha]_D^{23} = -36.8°$ ($c = 0.62$; 50% AcOH). Amino acid analysis showed the folowing proportions: Val: 1.0, β-cyklohexyl - Ala : 1.1; Arg: 1.0.

Example IV: N - Bz - β -cyclohexyl - Ala - Val - Arg - pNA . HCl

IVa. N - Bz - β - cyclohexyl - Ala - Val - Arg (NO₂) - pNA

Starting materials: 243 mg (0.335 mmole) of IIIb and 93 mg (0.41 mmole) of Bz₂O.
Method of synthesis: According to Example IIa.
Purification: Gel chromatography on Sephadex® LH-20 in MeOH.
Yield: 147 mg (63%) of IVa, m.p. 148°–152°C, homogeneous according to TLC in $P_1$ and $[\alpha]_D^{23} = -6.33°$ ($c = 0.84$; DMF).

IV. N - Bz - β - cyclohexyl - Ala - Val - Arg - pNA . HCl

Starting material: 106.0 mg (0.152 mmole) of IVa.
Method of synthesis: According to Example Id.
Purification: Gel chromatography on Sephadex® G-15 in 20% AcOH.
Yield: 86.7 mg (84%) of lyophilized, amorphous IV, chlorine content 5.10%, homogeneous according to TLC in A and $[\alpha]_D^{23} = -77°$ ($c = 0.3$; 50% AcOH). Amino acid analysis showed the following proportions: Val : 1.0, β-cyklohexyl - Ala : 1.2, Arg: 1.0.

Example V: N-Bz-N-cyclohexyl-β-Ala-Val-Arg-pNA.HCl

Va. N-Cbo-N-cyclohexyl-β-Ala-Val-Arg(NO₂)-pNA

Starting materials: 286 mg (0.5 mmole) of III a and 300 mg (0.7 mmole) of N-Cbo-N-cyclohexyl-β-Ala-OpNP.
Method of synthesis: According to Example Ib.
Purification: Gel chromatography on Sephadex® LH-20 in MeOH.
Yield: 313 mg (86%) of amorphous Va, homogeneous according to TLC in $P_1$ and $[\alpha]_D^{24} = \pm 0°$ (C = 1.0; DMF).

Vb. N-Bz-N-cyclohexyl-β-Ala-Val-Arg(NO₂)-pNa

Starting materials: 300 mg (0.413 mmole) of V a and 123 mg (0.544 mmole) of Bz₂O.
Method of synthesis: According to Example II a.
Purification: Gel chromatography on Sephadex® LH-20 in MeOH.

Yield: 243.5 mg (87%) of amorphous V b, homogeneous according to TLC in $P_1$ and $[\alpha]_D^{23} = 0.5°$ (C = 0.43; DMF.)

N-Bz-N-cyclohexyl-β-Ala-Val-Arg.pNA.HCl

Starting material: 170 mg (0.242 mmole) of V b.
Method of synthesis: According to Example Id.
Purification: Gel chromatography on Sephadex® LH-20 in MeOH.
Yield: 126 mg (76%) of lyophilized, amorphous V, chlorine content 5.11%, homogeneous according to TLC in A, $[\alpha]_D^{23} = -38.5°$ (C = 0.69; 50% AcOH). Amino acid analysis showed the following proportions: Val: 1.0, N-cyclohexyl-β-Ala: 1.3, Arg: 0.9.

Example VI: $N^\alpha$ -Bz-Val-Arg-pNA.HCl

VIa. Cbo-Val-Val-Arg(NO₂)-pNA

Starting materials: 1.97 g (3.43 mmoles) of IIIa and 1.6 g (4.2 m moles) of Cbo-Val-OpNP.
Method of synthesis: According to Example I b.
Purification: Gel chromatography on Sephadex® LH-20 in MeOH.
Yield: 1.9 g (82%) of amorphous VIa, homogeneous according to TLC in $P_1$ and C.

VIb. $N^\alpha$ -Bz-Val-Val-Arg(NO₂)-pNA

Starting materials: 1.9 g (2.83 mmoles) of VI a and 0.77 g (3.40 mmoles) of Bz₂O.
Method of synthesis: According to Example IIa.
Purification: Gel chromatography on Sephadex® LH-20 in MeOH.
Yield: 1.45 g (80%) of amorphous VIb, homogeneous according to TLC in $P_1$ and $[\alpha]_D^{23} = +5.6°$ (C = 1.01; DMF).

VI. $N^\alpha$ -Bz-Val-Val-Arg-pNA.HCl

Starting material: 362 mg (0.564 mmole) of VIb.
Method of synthesis: According to Example Id.
Purification: Gel chromatography on Sephadex® G-15 in 33% AcOH.
Yield: 248 mg(69.7%) of lyophilized amorphous VI, chlorine content 5.54%, homogeneous according to TLC in A and $[\alpha]_D^{24} = -57.0°$ (C=0.65; 50% AcoH). Amino acid analysis showed the following proportions: Val: 2.0, Arg: 0.9.

Example VII: $N^\alpha$ -Bz-Leu-Val-Arg-pNA.HCl.

VIIa. Cbo-Leu-Val-Arg(NO₂)-pNA

Starting material: 1.97 g (3.43 mmoles) of IIIa and 1.7 g (4.2 mmoles) of Cbo-Leu-OpNP.
Method of synthesis: According to Example Ib.
Purification: Gel chromatography on Sephadex® LH-20 in MeOH.
Yield: 2.05 g (87%) of amorphous VIIa, homogeneous according to TLC in $P_1$ and C.

VIIb. $N^\alpha$ -Bz-Leu-Val-Arg(NO₂)-pNA

Starting materials: 1.75 g (2.55 mmoles) of VIIa and 695 mg (3.06 mmoles) of Bz₂O.
Method of synthesis: According to Example IIa.
Purification: Gel chromatography on Sephadex® LH-20 in MeOH.
Yield: 1.49 g (91%) of amorphous VIIb, homogeneous according to TLC in $P_1$, and $[\alpha]_D^{23} = +2.4°$ (C=1.01; DMF).

VIII N$^\alpha$-Bz-Leu-Val-Arg-pNA.HCl

Starting material: 319 mg (0.486 mmole) of VIIb.
Method of synthesis: According to Example Id.
Purification: Gel chromatography on Sephadex® G-15 in 33% AcOH.
Yield: 276 mg (88%) of lyophilized, amorphous VII, chlorine content 5.41%, homogeneous according to TLC in A, $[\alpha]_D^{24} = -52.0°$ (C=0.65;50% AcOH). Amino acid analysis showed the following proportions: Val: 1.0; Leu: 1.1; Arg: 0.95.

Example VIII: N$^\alpha$-Bz-Ile-Val-Arg-pNA.HCl

VIIa. Cbo-Ile-Val-Arg(NO$_2$)-pNA

Starting materials: 1.97 g (3.43 mmoles) of IIIa and 1.7 g (4.2 mmoles) of Cbo-Ile-OpNP.
Method of synthesis: According to Example Ib.
Purification: Gel chromatography on Sephadex® LH-20 in MeOH.
Yield: 2.0 g (85%) of amorphous VIIIa, homogeneous according to TLC in P$_1$.

VIIIb. N$^\alpha$-Bz-Ile-Val-Arg(NO$_2$)-pNA

Starting materials: 1.75 g (2.55 mmoles) of VIIIa and 695 mg (3.06 mmoles) of Bz$_2$O.
Method of synthesis: According to Example IIa.
Purification: Gel chromatography on Sephadex® LH-20 in MeOH.
Yield: 1.46 g (89%) of amorphous VIIIb, homogeneous according to TLC in P$_1$.

VIII. N$^\alpha$-Bz-Ile-Val-Arg-pNA.HCl

Starting material: 319 mg (0.486 mmole) of VIIIb.
Method of synthesis: According to Example Id.
Purification: Gel chromatography on Sephadex® G-15 in 33% AcOH.
Yield: 264 mg (84%) of lyophilized, amorphous VIII, chlorine content 5.43%, homogeneous according to TLC in A and $[\alpha]_D^{23} = -29.9$ (C=0.59; 50% AcOH). Aminoacid analysis showed the following proportions: Val: 1.0; Ile: 0.9; Arg: 1.1

Example IX. N$^\alpha$-Bz-Val-Ile-Arg-pNA.HCl

IXa. Cbo-Ile-Arg(NO$_2$)-pNA

Starting materials: 4.9 g (10.4 mmoles) of Ia and 6.2 g (16 mmoles) of Cbo-Ile-OpNP.
Method of synthesis: According to Example Ib.
Purification: Gel chromatography on Sephadex® LH-20 in MeOH.
Yield: 4.75 g (78.1%) of partly chrystalline IXa, homogeneous according to TLC in P$_1$ and $[\alpha]_D^{23} = +2.3°$ (c=1.0; DMF).

IXb. Cbo-Val-Ile-Arg(NO$_2$)-pNA

Starting materials: 800 mg (1.37 mmoles) of IXa and 615 mg (1.65 mmoles) of Cbo-Val-OpNP.
Method of synthesis: According to Example Ib.
Purification: Gel chromatography on Sephadex® LH-20 in MeOH.
Yield: 833 mg (88.5%) of amorphous IXb, homogeneous according to TLC in P$_1$ and $[\alpha]_D^{24} = -3.23°$ (c=1.1; DMF).

IXc. N$^\alpha$-Bz-Val-Ile-Arg(NO$_2$)-pNA

Starting materials: 500 mg (0.73 mmole) of IXb and 198 mg (0.876 mmole) of Bz$_2$O.
Method of synthesis: According to Example IIa.
Purification: Gel chromatography on Sephadex® LH-20 in MeOH.
Yield: 374 mg (78%) of amorphous IXc, homogeneous according to TLC in P$_1$ and $[\alpha]_D^{23} = +1.9°$ (c=0.99; DMF).

N$^\alpha$-Bz-Val-Ile-Arg-pNA.HCl (IX)

Starting material: 200 mg (0.305 mmole) of IXc.
Method of synthesis: According to Example Id.
Purification: Gel chromatography on Sephadex® G-15 in 33% AcOH.
Yield: 153 mg (77.5%) of lyophilized, amorphous IX, chlorine content 5.40%, homogeneous according to TLC in A and $[\alpha]_D^{23} = -56.4°$ (c=0.64; 50% AcOH). Amino acid analysis showed the following proportions: Val: 1.0; Ile: 1.1; Arg 1.1.

Example X: N$^\alpha$-Val-Leu-Arg-pNA.HCl

Xa. Cbo-Val-Leu-Arg(NO$_2$)-pNA

Starting materials: 880 mg (1.5 mmoles) of Ib and 670 mg (1.8 mmoles) of Cbo-Val-OpNP.
Method of synthesis: According to Example Ib.
Purification: Gel chromatography on Sephadex® LH-20 in MeOH.
Yield: 882 mg (86%) of amorphous Xa, homogeneous according to TLC in P$_1$ and $[\alpha]_D^{23} = -6.6°$ (c=1.01; DMF).

Xb. N$^\alpha$-Bz-Val-Leu-Arg(NO$_2$)-pNA

Starting materials: 400 mg (0.583 mmole) of Xa and 160 mg (0.707 mmole) of Bz$_2$O.
Method of synthesis: According to Example IIa.
Purification: Gel chromatography on Sephadex® LH-20 in MeOH.
Yield: 279 mg (73%) of amorphous Xb, homogeneous according to TLC in P$_1$ and $[\alpha]_D^{23} = -0.4°$ (c=1.04; DMF).

X. N$^\alpha$-Bz-Val-Leu-Arg-pNA.HCl

Starting material: 150 mg (0.23 mmole) of Xb.
Method of synthesis: According to Example I.
Purification: Gel chromatography on Sephadex® G-15 in 33% AcOH.
Yield: 126 mg (84.5%) of lyophilized, amorphous X, chlorine content 5.45%, homogeneous according to TLC in A and $[\alpha]_D^{23} = -54.0°$ (c=0.64; 50% AcOH). Amino acid analysis showed the following proportions: Val: 1.0; Leu: 1.1; Arg: 1.0.

Example XI: N$^\alpha$-Bz-Ile-Ile-Arg-pNA.HCl

IXa. Cbo-Ile-Ile-Arg(NO$_2$)-pNA

Starting materials: 800 mg (1.37 mmoles) of IXa and 640 mg (1.66 mmoles) of Cbo-Ile-OpNP.
Methods of synthesis: According to Example Ib.
Purification: Gel chromatography on Sephadex® LH-20 in MeOH.
Yield: 838 mg (87.5%) of partly chrystalline XXa, homogeneous according to TLC in P$_1$ and $[\alpha]_D^{23} = -5.7$ (c=1.04; DMF).

XIb. N$^\alpha$-Bz-Ile-Ile-Arg(NO$_2$)-pNA

Starting materials: 440 mg (0.63 mmole) of XIa and 171 mg (0.76 mmole) of Bz$_2$O.
Method of synthesis: According to Example IIa.

Purification: Gel chromatography on Sephadex ® LH-20 in MeOH.
Yield: 409 mg (97%) of partly chrystalline XIb, homogeneous according to TLC in $P_1$.

XI. $N^\alpha$ -Bz-Ile-Ile-Arg-pNA.HCl

Starting material: 201 mg (0.3 mmole) of XIb.
Method of synthesis: According to Example I.
Purification: Gel chromatography on Sephadex ® G-15 in 33% AcOH.
Yield: 172 mg (87%) of lyophilized, amorphous XI, chlorine content 5.33%, homogeneous according to TLC in A and $[\alpha]_D^{23} = -57.0°$ (c=0.67; 50% AcOH).
Amino acid analysis showed the following proportions: Ile: 2.0; Arg: 0.9.

Example XII: $N^\alpha$ - Bz - Leu - Ile - Arg - pNA . HCl

XIIa. Cbo - Leu - Ile - Arg (NO₂) - pNA

Starting materials: 800 mg (1.37 mmoles) of IXa and 640 mg (1.66 mmoles) of Cbo - Leu - OpNP.
Method of synthesis: According to Example Ib.
Purification: Gel chromatography on Sephadex ® LH-20 in MeOH.
Yield: 772 mg (81%) of amorphous XIIa, homogeneous according to TLC in $P_1$ and $[\alpha]_D^{23} = -7.3°$ (c = 1.02; DMF).

XIIb. $N^\alpha$ - Bz - Leu - Ile - Arg (NO₂)- pNA

Starting materials: 500 mg (0.72 mmole) of XIIa and 205 mg (0.86 mmole) of Bz₂O.
Method of synthesis: According to Example IIa.
Purification: Gel chromatography on Sephadex ® LH-20 in MeOH.
Yield: 482 mg (82%) of amorphous XIIb, homogeneous according to TLC in $P_1$ and $[\alpha]_D^{23} = +0.5°$ (c = 1.03; DMF).

XII. $N^\alpha$ -Bz - Leu - Ile - Arg - pNA . HCl

Starting material: 193 mg (0.288 mmole) of XIIb.
Method of synthesis: According to Example I.
Purification: Gel chromatography on Sephadex ® G-15 in 33% AcOH.
Yield: 166 mg (86%) of lyophilized, amorphous XII, chlorine content 5.34%, homogeneous according to TLC in A and $[\alpha]_D^{23} = -51.4°$ (c = 0.67; 50% AcOH).
Amino acid analysis showed the following proportions: Leu: 1.0; Ile: 1.2; Arg: 0.9.

Example XIII: $N^\alpha$ - Bz - Ile - Leu - Arg - pNA . HCl

XIIIa. Cbo - Ileu - Leu - Arg - (NO₂) - pNA

Starting materials: 880 mg (1.5 mmoles) of Ib and 696 mg (1.8 mmoles) of Cbo - Ileu - OpNP.
Method of synthesis: According to Example Ib.
Purification: Gel chromatography on Sephadex ® LH-20 in MeOH.
Yield: 750 mg (71%) of amorphous XIIIa, homogeneous according to TLC in $P_1$ and $[\alpha]_D^{23} = -9.85°$ (c = 1.05; DMF).

XIIIb. $N^\alpha$ - Bz -Ileu - Leu - Arg (NO₂) - pNA

Starting materials: 498 mg (0.71 mmole) of XIIIa and 193 mg (0.85 mmole) of Bz₂O.
Method of synthesis: According to Example IIa.
Purification: Gel chromatography on Sephadex ® LH-20 in MeOH.
Yield: 345 mg (73%) of partly chrystalline XIIIb, homogeneous according to TLC in $P_1$ and $[\alpha]_D^{23} = -5.7°C$ (c = 1.04; DMF).

XIII. $N^\alpha$ - Bz - Ile - Leu - Arg - pNA . HCl

Starting materials: 170 mg (0.254 mmole) of XIIIb.
Method of synthesis: According to Example I.
Purification: Gel chromatography on Sephadex ® G-15 in 33% AcOH.
Yield: 129 mg (77%) of lyophilized, amorphous XIII, chlorine content 5.31%, homogeneous according to TLC in A and $[\alpha]_D^{23} = -49.9°$ (c = 0.68; 50% AcOH).
Amino acid analysis showed the following proportions: Leu: 1.0; Ile: 1.1; Arg: 1.05.

Example XIV: $N^\alpha$ - Bz - Leu - Leu - Arg - 2 -NA . HCl

XIVa. Cbo - Arg (NO₂) - 2 - NA 3.6 g (10 mmoles) of dry Cbo - Arg (NO₂) - OH are dissolved in 200 ml of THF. 1.0 g (10 mmoles) of Et₃N are added, where upon the solution is cooled to −10°C under completely moisture free conditions.
1.3 g (10 mmoles) of isobutyl chloroformate dissolved in 10 ml of THF are added to the cooled solution during 10 min., and after another 10 min. 1.72 g (10 mmoles) of 2-naphthylamine are added. The reaction mixture is allowed to reach room temperature and is left at this temperature for 24 hours. The reaction mixture is evaporated in vacuum to dryness, is treated 3–5 times with destilled water, 3–5 times with a 5% sodium bicarbonate solution and again 3–5 times with destilled water, after which it is dried in vacuum.
Purification: Gel chromatography on Sephadex ® LH-20 in MeOH.
Yield: 4.05 g (84%) of partly chrystalline XIVa, homogeneous according to TLC in $P_1$ and C, and $[\alpha]_D^{23} = +7.35°$ (c = 1.0; DMF).

XIVb. Cbo - Leu - Arg (NO₂) - 2 NA

Starting materials: 1.5 g (3.1 mmoles) of XIV a and 1.43 g (3.7 mmoles) of Cbo - Leu - OpNP.
Method of synthesis: According to Example Ib.
Purification: Gel chromatography on Sephadex ® LH-20 in MeOH.
Yield: 1.6 g (86%) of amorphous XIVb, homogeneous according to TLC in $P_1$ and $[\alpha]_D^{22} = -9.1°$ (c = 1.0; DMF).

XIVc. Cbo - Leu - Leu - Arg (NO₂) - 2 - NA

Starting materials: 1.35 g (2.26 mmoles) of XIVb and 1.05 g (2.71 mmoles) of Cbo-Leu-OpNP.
Method of synthesis: According to Example Ib.
Purification: Gel chromatography on Sephadex ® LH-20 in MeOH.
Yield; 1.00 g (62.4%) of partly chrystalline XIV c, homogeneous according to TLC in $P_1$ and $[\alpha]_D^{24} = -20.6°$ (c = 1.0; DMF).

XIVb. $N^\alpha$ - Bz - Leu - Arg (NO₂) - 2 NA

Starting materials: 990 mg (1.4 mmoles) of XIVc and 407 mg (1.8 mmoles) of Bz₂O.
Method of synthesis: According to Example IIa.
Purification: Gel chromatography on Sephadex® LH-20 in MeOH.
Yield: 800 mg (84%) of amorphous XIVd, homogeneous according to TLC in $P_1$ and $[\alpha]_D^{20} = -13.4°$ (c = 1.0; DMF).

XIV. $N^\alpha$ - Bz - Leu - Leu - Arg - 2 - NA . HCl

Starting material: 350 mg (0.52 mmole) of XIV$d$.
Method of synthesis: According to Example I.
Purification: Gel chromatography on Sephadex® G-15 in 33% AcOH.
Yield: 260 mg (75%) of lyophilized, amorphous XIV, chlorine content 5.30%, homogeneous according to TLC in A and $[\alpha]_D^{20} = -51.8°$ ($c = 0.57$; 50% AcOH). Amino acid analysis showed the following proportions: Leu: 2.0; Arg: 0.95.

Example XV: $N^\alpha$ - Bz - Leu - Leu - Arg - 1 - nitro - 2 - NA . HCl

XV$a$. Cbo - Arg (NO$_2$) - 1 - nitro - 2 - NA

Starting materials: 3.6 g (10 mmoles) of Cbo - Arg (NO$_2$) - OH and 2.26 g (12 mmoles) of 1 - nitro - 2 - naphthylamine.
Method of synthesis: According to Example XIV$a$.
Purification: Gel chromatography on Sephadex® LH-20 in MeOH.
Yield: 3.1 g (58.7%) of amorphous XV$a$, homogeneous according to TLC in P$_1$ and C and $[\alpha]_D^{19} = -11.8°$ ($c = 1.0$; DMF).

XV$b$. Cbo - Leu - Arg (NO$_2$) - 1 - nitro - 2 - NA

Starting materials: 950 mg (1.8 mmoles) of XV$a$ and 850 mg (2.2 mmoles) of Cbo - Leu - OpNP.
Method of synthesis: According to Example I$b$.
Purification: Gel chromatography on Sephadex® LH-20 in MeOH.
Yield: 900 mg (78%) of amorphous XV$b$, homogeneous according to TLC in P$_1$ and $[\alpha]_D^{22} = -10.2°$ ($c = 1.02$; DMF).

XV$c$. Cbo - Leu - Leu - Arg (NO$_2$) - 1 - nitro - 2 - NA

Starting materials: 900 mg (1.4 mmoles) of XV$b$ and 650 mg (1.7 mmoles) of Cbo - Leu - OpNP.
Method of synthesis: According to Example I$b$.
Purification: Gel chromatography on Sephadex® LH-20 in MeOH.
Yield: 810 mg (77%) of amorphous XV$c$, homogeneous according to TLC in P$_1$ and $[\alpha]_D^{24} = -18.2°$ ($c = 1.01$: DMF).

XV$d$. $N^\alpha$ - Bz - Leu - Leu - Arg (NO$_2$) - 1 - nitro - 2 - NA

Starting materials: 680 mg (0.88 mmole) of XV$c$ and 260 mg (1.15 mmoles) of Bz$_2$O.
Method of synthesis: According to Example II$a$.
Purification: Gel chromatography on Sephadex® LH-20 in MeOH.
Yield: 480 mg (73%) of amorphous XV$d$, homogeneous according to TLC in P$_1$ and $[\alpha]_D^{24} = -31.4°$ ($c = 0.9$; DMF).

XV. $N^\alpha$ - Bz - Leu - Leu - Arg - 1 - nitro - 2 - NA . HCl

Starting material: 74 mg (0.1 mmole) of XV$d$.
Method of synthesis: According to Example I.
Purification: Gel chromatography on Sephadex® G-15 in 33% AcOH.
Yield: 47 mg (66%) of lyophilized, amorphous XV, chlorine content 4.94%, homogeneous according to TLC in A and $[\alpha]_D^{22} = -33.6°$ ($c = 0.72$; 50% AcOH). Amino acid analysis showed the following proportions: Leu: 2.0; Arg: 0.9.

Example XVI: $N^\alpha$ - Bz - Leu - Leu - Arg - 4 - nitro - 1 - NA . HCl

XVI$a$. Cbo - Arg (NO$_2$) - 4 - nitro - 1 - NA

Starting materials: 3.6 g (10 mmoles) of Cbo - Arg (NO$_2$) - OH and 2.26 g (12 mmoles) of 4 - nitro - 1 - naphthylamine.
Method of synthesis: According to Example XIV$a$.
Purification: Gel chromatography on Sephadex® LH-20 in MeOH.
Yield: 2.9 g (55%) of amorphous XVI$a$, homogeneous according to TLC in P$_1$ and C and $[\alpha]_D^{22} = -11.4°$ ($c = 1.01$; DMF).

XVI$b$. Cbo - Leu - Arg (NO$_2$) - 4 - nitro - 1 - NA

Starting materials: 650 mg (1.23 mmoles) of XVI$a$ and 560 mg (1.45 mmoles) of Cbo - Leu - OpNP.
Method of synthesis: According to Example I$b$.
Purification: Gel chromatography on Sephadex® LH-20 in MeOH.
Yield: 520 mg (66%) of amorphous XVI$b$, homogeneous according to TLC in P$_1$ and $[\alpha]_D^{22} = -11.8°$ ($c = 0.2$; DMF).

XVI$c$. Cbo - Leu - Leu - Arg (NO$_2$) - 4 - nitro - 1 - NA

Starting materials: 520 mg (0.81 mmole) of XVI$b$ and 375 mg (0.97 mmole) of Cbo - Leu - OpNP.
Method of synthesis: According to Example I$b$.
Purification: Gel chromatography on Sephadex® LH-20 in MeOH.
Yield: 378 mg (62%) of partly chrystalline XVI$c$, homogeneous according to TLC in P$_1$ and $[\alpha]_D^{23} = -18.0°$ ($c = 1.0$; DMF).

XVI$d$. $N^\alpha$ - Bz - Leu - Leu - Arg (NO$_2$) - 4 - nitro - 1 - NA

Starting materials: 150 mg (0.2 mmole) of XVI$c$ and 57 mg (0.25 mmole) of Bz$_2$O.
Method of synthesis: According to Example II$a$.
Purification: Gel chromatography on Sephadex® LH-20 in MeOH.
Yield: 120 mg (83%) of amorphous XVI$d$, homogeneous according to TLC in P$_1$ and $[\alpha]_D^{23} = 30.9°$ ($c = 0.95$; DMF).

XVI. $N^\alpha$ - Bz - Leu - Leu - Arg - 4 - nitro - 1 - NA . HCl

Starting material: 120 mg (0.165 mmole) of XVI$d$.
Method of synthesis: According to Example I.
Purification: Gel chromatography on Sephadex® G-15 in 33% AcOH.
Yield: 48 mg (42%) of lyophilized, amorphous XVI, chlorine content 4.95%, homogeneous according to TLC in A and $[\alpha]_D^{22} = -36.0°$ ($c = 0.71$; 50% AcOH). Amino acid analysis showed the following proportions Leu: 2.0; Arg: 0.9.

Example XVII: $N^\alpha$ - Bz - Leu - Leu - Lys - pNA . HCl

XVII$a$. $N^\alpha$ - BOC - Lys ($\epsilon$ - Cbo) - pNA 6.3 g (11.2 mmoles) of N - BOC - Lys ($\epsilon$ - Cbo) - OH . DCHA are dissolved in 40 ml of dry, freshly destilled HMPTA at room temperature, where upon 5 g (30.5 mmoles) of p-nitro-phenylisocyanate are aded successively with stirring under completely moisture free conditions. After 24 hours at room temperature the reaction mixture is worked up according to the description in Example Ia. The insoluble part, consisting of N, N¹ - bis - p - nitrophenylcarbamide, is filtered off. The filtrate is purified by gel chromatography on a column of Sephadex® LH-20 equilibrated with MeOH.
Yield: 4.17 g (74.5%) of partly chrystalline XVIIa, homogeneous according to TLC in $P_1$ and $[\alpha]_D^{21} = +1.7°$ ($c = 1.0$; DMF).

XVIIb. $N^\alpha$ - BOC - Leu - Lys ($\epsilon$ - Cbo) - pNA 2.20 g (4.4 mmoles) of XVIIa are dissolved in 10 ml freshly destilled trifluoroacetic acid under completely moisture free conditions. The reaction mixture is stirred for one hour at room temperature and thereafter it is slowly poured into 150 ml of dry vigerously stirred ether, whereby $CF_3 COOH . H$ - Lys ($\epsilon$ - Cbo) - pNA precipitates out after cooling. The ether solution is decanted off and the amorphous residue is treated another three times with 75 ml of ether. After being dried in vacuum over $P_2O_5$ and NaOH, the yield of the trifluoroacetic acid salt of the amino acid derivate is quantitative (2.25 g).

2.25 g (4.4 mmoles) of $CF_3 COOH . H$ - Lys ($\epsilon$ - Cbo) - pNA are dissolved in 10 ml DMF. The solution is cooled to −10°C and 0.78 ml (5.5 mmoles) $Et_3N$ is added to liberate the amino acid salt. 2.4 g (6.5 mmoles) of BOC - Leu - OpNP are added and the solution is allowed to reach the room temperature. After 3 hours the solution is cooled again to −10°C and buffered with 0.31 ml (2.2 mmoles) of $Et_3N$. The buffering procedure is repeated once more after 2–3 hours. After 24 hours reaction time the solution is evaporated at 40°C in vacuum to dryness. The evaporation residue is treated three times with 20 ml of destilled water and then dried in vacuum. The crude, dry residue is dissolved in MeOH and purified by gel chromatography on a column of Sephadex® LH-20 equilibrated with MeOH.
Yield: 1.70 g (70%) of amorphous XVIIb, homogeneous according to TLC in $P_1$ and C, and $[\alpha]_D^{22} = -4.9°$ ($c = 1.1$; DMF).

XVIIc. N - BOC - Leu - Leu - Lys ($\epsilon$ - Cbo) - pNA

Starting materials: 950 mg (1.55 mmoles) of XVIIb and 1.16 g (3.1 mmoles) of BOC - Leu - OpNP.
Method of synthesis: According to Example XVIIb.
Purification: Gel chromatography on Sephadex® LH-20 in MeOH.
Yield: 985 mg (88%) of amorphous XVIIc, homogeneous according to TLC in $P_1$ and $[\alpha]_D^{20} = -22.0°$ ($c = 1.0$; DMF).

XVIId. $N^\alpha$ - Bz - Leu - Leu - Lys ($\epsilon$ - Cbo) - pNA

Starting materials: 1.25 g (1.4 mmoles) of XVIIc and 384 mg (1.7 mmoles) of $Bz_2O$.
Method of synthesis: Decarbobutyloxylation of XVIIc was carried out according to the procedure in Example XVIIb.

The dry $CF_3COOH . H$ - Leu - Leu - Lys ($\epsilon$ - Cbo) - pNa was dissolved in 20 ml of DMF and cooled to −10°C, where after 200 ml (1.45 mmoles) of $Et_3N$ were added to liberate the peptide amine from its salt. 384 mg (1.7 mmoles) of $Bz_2O$ were added to the solution at −10°C, after which the procedures of buffering and work up were carried out according to Example XVIIb.
Purification: Gel chromatography on Sephadex® LH-20 in MeOH.
Yield: 920 mg (90%) of partly chrystalline XVIId, homogeneous according to TLC in $P_1$ and C, and $[\alpha]_D^{20} = -5.95°$ ($c = 1.02$; DMF).

XVIIe. $N^\alpha$ - Bz - Leu - Leu - Lys - pNA . HCl

Starting material: 300 mg (0.41 mmole) of XVIId.
Method of synthesis: According to Example I.
Purification: Gel chromatography on Sephadex® G-15 in 33% AcOH.
Yield: 170 mg (66%) of lyophilized amorphous XVII, chlorine content 5.51%, homogeneous according to TLC in A, and $[\alpha]_D^{22} = -50.5°$ ($c = 0.62$; 50% AcOH). Amino acid analysis showed the following proportions: Leu: 2.0; Lys: 0.35.

The substrates produced according to the examples were used for determination of different enzymes according to the following:

The principle for the determination is based upon the fact that the product formed by the enzymatic hydrolysis shows an UV spectrum which is entirely separate from that of the substrate. Thus, the substrate according to Example II $N^\alpha$ -Bz-Leu-Leu-Arg-pNA.HCl has an absorption maximum at 302 nm with the molar extinction coefficient 12920. The absorption of the substrate is insignificant at 405 nm. p-Nitroaniline (pNA), which is formed from the substrate during the enzymatic hydrolysis, has an absorption maximum at 380 nm with a molar extinction coefficient of 13,200, which at 405 nm has only been reduced to 9620.

Therefore, by means of measuring spectrophotometrically at 405 nm, one can readily follow the degree of the enzymatic hydrolysis which is proportional to the amount of p-nitro aniline formed. The excess of substrate which is present does not interfere with the measurement at that wave-length. The circumstances are almost identical for the remaining substrates of the invention, and for this reason the spectrophotometric measurements were throughout made at 405 nm.

The enzymatic reaction can schematically be written in the following manner:

$$E + S \underset{k_2}{\overset{k_1}{\rightleftarrows}} ES \overset{k_3}{\longrightarrow} ES' + \text{chromophore } P_1$$
$$\downarrow k_4$$
$$E + P_2$$

$E$ = enzyme
$S$ = substrate
$ES$ = enzyme-substrate complex
$P_1$ and $P_2$ = products
$k_1, k_2, k_3$ and $k_4$ = rate constants Dissociation const. for $ES = \dfrac{k_2}{k_1} = K_m$ (Michaelis const.)

If $(S) \gg (E)$ and $k_4 \ll k_3$ the following is true:

$$K_m = \frac{[(E) - (ES)] \times (S)}{(ES)} \qquad (1)$$

The rate at which the chromophore $P_1$ is formed: $v = k_3 \times (ES)$ $$V = \frac{k_3 \times (E) \times (S)}{K_m + (S)} \quad (2)$$

When all $E$ is bound to $S$, $(ES) = (E)$ and $$v = v_{max} = k_3 \times (E) \quad — (3)$$

Lineweaver - Burk equation:

$$\frac{1}{v} = \frac{K_m}{v_{max}} \times \frac{1}{(S)} + \frac{1}{v_{max}}; \quad (4)$$

As evident from equation (2), the constants $K_m$ and $k_3$ determine the efficiency of the enzyme substrate for a given enzyme. For the purpose of determining these constants, the procedure is in principle the following: The enzyme and the substrate are mixed in a buffer solution and the reaction is followed spectrophotometrically for 5 min. The concentration of the substrate $(S)$ is varied, while the enzyme concentration $(E)$ for each substrate is kept constant. The extinction $(OD)$ is plotted as a function of time. From the curve obtained in this manner the tangent (= difference in extinction per min, $\Delta$ OD/min, from which the amount $\mu$mol formed p-NA/min $(V)$, may be calculated) at time zero gives the initial reaction rate, $v$. If $1/v$ is plotted against $1/(S)$ $K_m$ and $v_{max}$ (of equation (4)) are obtained from the diagram. $K_m$ and $k_3 = v_{max}/(E)$ for trypsin and different enzyme substrates are given in Table 1 and for thrombin in Table 2. The data regarding $K_m$ and $k_3$ is missing in those cases where the values have not been determined, or where they could not be calculated because no linear relation between $1/v$ and $1/(S)$ was obtained.

A rough evaluation of the enzyme-substrate relationship for different substrates may be obtained by means of comparing the amount of p-nitro-aniline formed per min. and per ml at the same concentration of the substrates. This is shown in Table 3 for trypsin, in Table 4 for thrombin and in Table 5 for plasmin.

The letters NIH used in the Tables refer to units of the National Institute of Health. The trypsin unit is equal to the hydrolysis of one $\mu$mole of $N^\alpha$-tosyl-arginine-methyl ester hydrochloride (TAME) per minute at 25°C and pH 8.1 in the presence of 0.01 M calcium ion, and the trypsin was obtained from Worthington Biochemical Corporation, Freehold, N.J., USA. The plasmin was obtained from AB Kabi, Stockholm, Sweden, and 1 mg was equal to 3 casein units (CU).

Table 1

Trypsin-activity, $K_m$ and $k_3$

| Substrate | Substrate conc. (umole/l) | Enzyme conc. (NIH/ml) | $K_m \times 10^4$ (mole/l) | $k_3 \times 10^4$ (umole/min, NIH/ml) |
|---|---|---|---|---|
| BAPNA | 250–666 | 75 | 16 | 8,3 |
| I | 33.6–112.0 | 6 | 7.40 | 330 |
| II | 35.0–150.0 | 3.3 | 0.64 | 276 |
| IV | 35.0–150.0 | 3.3 | 0.17 | 71 |

Table 2

Thrombin-activity, $K_m$ and $k_3$

| Substrate | Substrate conc. (umole/l) | Enzyme conc. (NIH/ml) | $K_m \times 10^4$ (mole/l) | $k_3 \times 10^4$ (umole/min, NIH/ml) |
|---|---|---|---|---|
| BAPNA | 250–666 | 50 | ~6 | ~11 |
| I | 33.6–112.0 | 10 | 2.92 | 40 |

Table 3

Trypsin-activity

| Substrate | Substrate conc. nmoles per ml | Enxyme conc. units per ml | Formed p-nitroaniline nmoles per min. per ml |
|---|---|---|---|
| BAPNA | 333.0 | 50.0 | 1.04 |
| II | 66.9 | 0.0833 | 14.2 |
| III | 66.7 | " | 16.8 |
| IV | 67.0 | " | 10.2 |
| V | 66.3 | " | 22.7 |
| VI | 66.8 | " | 12.8 |
| VII | 66.2 | " | 16.6 |
| VIII | 66.7 | " | 17.1 |
| IX | 67.0 | " | 12.0 |
| X | 67.1 | " | 15.5 |
| XI | 66.3 | " | 12.4 |
| XII | 65.9 | " | 16.5 |
| XIII | 66.9 | " | 16.7 |

Table 4

Thrombin-activity

| Substrate | Substrate conc. nmoles per ml | Enzyme conc. NIH-units per ml | Formed p-nitroaniline nmoles per min. per ml |
|---|---|---|---|
| BAPNA | 333.0 | 2.08 | 6.1 |
| II | 66.9 | 0.417 | 1.8 |
| III | 67.2 | " | 0.5 |
| IV | 67.0 | " | 0.9 |
| V | 66.5 | " | 1.7 |
| VI | 66.8 | " | 0.2 |
| VII | 66.2 | " | 0.4 |
| VIII | 66.7 | " | 0.1 |
| IX | 67.0 | " | 0.3 |
| X | 67.1 | " | 0.4 |
| XI | 66.3 | " | 0.2 |
| XII | 66.3 | " | 0.7 |
| XIII | 66.9 | " | 0.2 |
| XVII | 67.0 | " | 0.1 |

Table 5

Plasmin-activity

| Substrate | Substrate conc. nmoles per ml | Enzyme conc. CU-units per ml | Formed p-nitroaniline nmoles per min. per ml |
|---|---|---|---|
| II | 66.9 | 0.167 | 2.7 |
| III | 66.7 | " | 17.2 |
| IV | 67.0 | " | 2.7 |
| V | 66.5 | " | 7.7 |
| VI | 66.8 | " | 2.8 |
| VII | 66.2 | " | 2.2 |
| VIII | 66.7 | " | 4.0 |
| IX | 67.0 | " | 1.5 |
| X | 67.1 | " | 17.2 |
| XI | 66.3 | " | 2.0 |
| XII | 65.9 | " | 1.5 |
| XIII | 66.9 | " | 17.9 |
| XVII | 67.0 | " | 21.3 |

The Tables 1 – 5 clearly demonstrate the advantages of the enzyme substrates of the invention when compared with the amide substrate previously used for trypsin (BAPNA). By means of their greater sensitivity the new substrates make the determination of small amounts of enzyme possible without jeopardizing the exactness of the determination. This is very important from a clinical point of view, since it simplifies the collection of specimen.

What is claimed is:

1. Substrate with a high susceptibility to peptide peptidohydrolases which is represented by the formula:

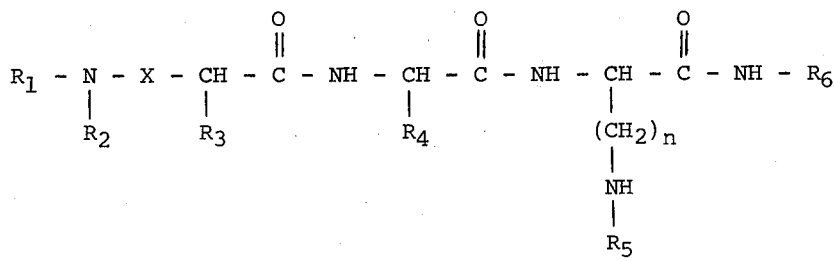

or acid addition salts thereof, where $R_1$ is selected from the group consisting of hydrogen, an acyl alkyl-carbonyl having 1–12 carbon atoms, a ω-aminoalkyl-carbonyl having 1–12 carbon atoms in a straight chain, cyclohexyl-carbonyl, a ω-cyclohexylalkyl-carbonyl having 1–6 carbon atoms in a straight chain, 4-aminomethyl-cyclohexylcarbonyl, benzoyl, a ω-phenylalkyl-carbonyl having 1–6 carbon atoms in a straight chain, benzenesulphonyl and 4-toluenesulphonyl; $R_2$ is selected from the group consisting of hydrogen, phenyl, cyclohexyl and an alkyl having 1–6 carbon atoms; X is selected from the group consisting of methylene and a single bond; $R_3$ is selected from the group consisting of straight, branched and cyclic alkyl groups having 3–8 carbon atoms; $R_4$ is selected from the group consisting of straight, branched and cyclic alkyl groups having 3–8 carbon atoms, phenyl and benzyl; $n$ is 3 or 4; $R_5$ is selected from the group consisting of hydrogen and guanyl; and $R_6$ is selected from the group consisting of phenyl, nitrophenyl, methylnitrophenyl, naphthyl, nitronaphthyl, quinolyl, and nitroquinolyl.

2. The substrate of claim 1 wherein $R_1$ is benzoyl.

3. The substrate of claim 1 wherein $R_1$ is hydrogen.

4. The substrate of claim 1 wherein $R_2$ is hydrogen.

5. The substrate of claim 1 wherein $n$ is 3 and $R_5$ is guanyl.

6. The substrate of claim 1 wherein $n$ is 4 and $R_5$ is hydrogen.

7. The substrate of claim 1 wherein $R_6$ is nitrophenyl.

8. The substrate of claim 1 wherein $R_6$ is naphthyl.

9. The substrate of claim 1 wherein $R_6$ is nitronaphthyl.

10. The substrate of claim 1 wherein said substrate is $N^\alpha$-benzoyl-leucyl-leucyl-arginine-p-nitroanilide or the HCl salt thereof.

11. The substrate of claim 1 wherein said substrate is $N^\alpha$-benzoyl-N-cyclohexyl-$\beta$-alanyl-valyl-arginine-p-nitroanilide or the HCl salt thereof.

12. The substrate of claim 1 wherein said substrate is $N^\alpha$-benzoyl-leucyl-valyl-arginine-p-nitroanilide or the HCl salt thereof.

13. The substrate of claim 1 wherein said substrate is $N^\alpha$-benzoyl-isoleucyl-valyl-arginine-p-nitroanilide or the HCl salt thereof.

14. The substrate of claim 1 wherein said substrate is $N^\alpha$-benzoyl-valyl-isoleucyl-arginine-p-nitroanilide or the HCl salt thereof.

15. The substrate of claim 1 wherein said substrate is $N^\alpha$-benzoyl-valyl-leucyl-arginine-p-nitroanilide or the HCl salt thereof.

16. The substrate of claim 1 wherein said substrate is $N^\alpha$-benzoyl-isoleucyl-leucyl-arginine-p-nitroanilide or the HCl salt thereof.

17. The substrate of claim 1 wherein said substrate is $N^\alpha$-benzoyl-leucyl-leucyl-arginine-2-naphthylamide or the HCl salt thereof.

18. The substrate of claim 1 wherein said substrate is $N^\alpha$-benzoyl-leucyl-leucyl-arginine-4-nitro-1-naphthylamide or the HCl salt thereof.

19. The substrate of claim 1 wherein said substrate is $N^\alpha$-benzoyl-leucyl-leucyl-lysine-p-nitroanilide or the HCl salt thereof.

* * * * *